United States Patent

[11] 3,622,860

[72] Inventor: Erich Hayek, Marzstrasse, Austria
[21] Appl. No.: 35,805
[22] Filed: May 8, 1970
[45] Patented: Nov. 23, 1971
[73] Assignee: Firma E. Schrack Elektrizitats-Aktiengesellschaft Pottendorferstrasse, Austria
[32] Priority: May 16, 1969
[33] Austria
[31] A4711/69

[54] APPARATUS FOR THE DETECTION AND INDICATION OF FLASH-OVER IN A RECTIFIER DEVICE
5 Claims, 4 Drawing Figs.

[52] U.S. Cl. ................................................ 321/11, 340/253 E
[51] Int. Cl. ............................................... H02m 1/18
[50] Field of Search ........................ 321/11, 12, 14; 328/8; 340/253 E

[56] References Cited
UNITED STATES PATENTS
2,568,172  9/1951  Spencer ............... 340/253 (E) X
2,703,877  3/1955  Stoff et al. ............ 340/253 (E)
3,040,234  6/1962  Walker et al. ........ 321/14 X
3,119,958  1/1964  Ainsworth ............ 321/12
3,335,316  8/1967  Schneider ............. 321/11 X Primary Examiner—William M. Shoop, Jr.
Attorney—Ernest G. Montague ABSTRACT: An apparatus for the detection and indication of flashovers at the output side of a rectifier, in particular for electrostatic high-voltage filters, which comprises a rectifier transformer, primary alternating current circuitry, and secondary direct current circuitry including direct current output terminals. A series rheostat is connected in the direct current circuitry, whereby flashovers result in a drop in potential at the series rheostat. The drop in potential is proportional to fluctuations of the direct current as a result of the flashover, including a capacitance which is provided in the direct current circuitry ahead of the series rheostat and in parallel with the output terminals. A high pass filter is connected with the series rheostat, and means are provided for indicating a flashover connected with the high pass filter.

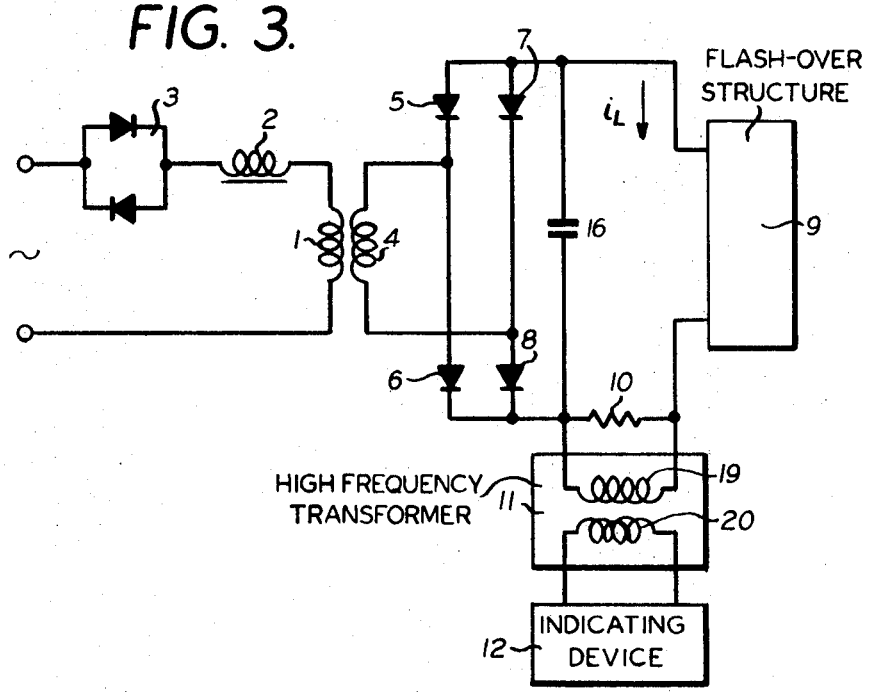
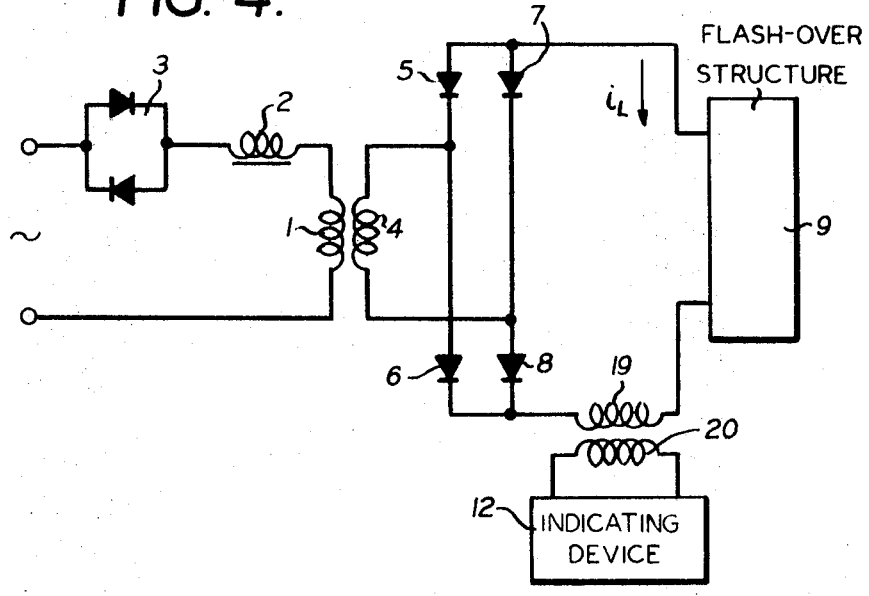

APPARATUS FOR THE DETECTION AND INDICATION OF FLASH-OVER IN A RECTIFIER DEVICE

The present invention relates to an apparatus for the detection and indication of electrical flashover or sparkover at the output side of a rectifier device, in particular for electrostatic high-voltage filters, in which a series rheostat is disposed in the starting direct current circuitry on which a voltage drop is created which is proportional to the fluctuation of the direct current, whereby the alternating voltage occurring on the series rheostat in case of a breakdown is applied for an indication.

The apparatus of the present invention is particularly applicable to electrical dust precipitator apparatus but is not limited to this use.

Several solutions have been known, which deliver a criterion for the breakdown and short circuit, respectively, at the output of a single or multiphase rectifier device, which is equipped with a primary circuit impedance for limiting flashover current and a regulating or adjusting member for controlling the direct current output. Thus, devices have been known in which a low voltage on the direct current side is detected. These structures have, however, the drawback that the low-voltage measurement occurs as soon as the device is switched on. For high-voltage rectifiers, an expensive potentiometer or voltage divider is required.

In other known devices a differentiation of the direct voltage takes place, whereby here also the drawback is inherent that a potentiometer or voltage divider must be provided.

It has also been known, to use a differentiation of the primary transformer voltage. This measure has the drawback that the high-frequency built-up transient oscillations simulate flashovers.

Apparatus for the detection of excess primary or excess direct current has the disadvantage, that on selecting a constant reference measurement or threshold, it must be so selected, that it is greater than the rated current load of the apparatus. In partial load operation this reference is not exceeded, and in order to remove this disadvantage, the reference measurement must be made dependent on the current, which is particularly expensive with high-flashover frequencies.

In the German Pat. specification No. 1,113,443, an electrostatic dust precipitator is known of a type similar to the apparatus discussed above. However, in this structure, only the low-frequency alternating voltages always present in the series rheostat and which are caused by current changes due to a flashover are used for the detection of flashovers.

It is one object of the present invention, to provide an apparatus for the detection and indication of the flashover in a rectifier device, which avoids the disadvantages of known apparatus and provides a criterion or measurement of the flashover on the direct current side of the rectifying apparatus, i.e., a criterion which is independent of the load.

It is another object of the present invention to provide an apparatus for the detection and indication of flashover in a rectifier device, wherein a capacitance is arranged in circuit ahead of the series rheostat and parallel with the output terminals of the rectifier. In case of flashovers the capacitance discharges in the form of a high-frequency, damped oscillation by way of the series rheostat, to which a high-pass filter is connected.

The presence of flashover is then detected at the output side of the high-pass filter. Not only does this measurement achieve the desired object, but, when used in association with a contactless or electronic control, it enables the flashover frequency (for example in a dust filter installation) to be controlled up to a very high-flashover density. A substantial advantage of the apparatus according to the present invention lies in the fact, that the high-frequency indicating signal depends only on the voltage of the capacitances and not on the load conditions in the rectifier device.

Advantageously the capacitance is formed either partially or entirely, by the winding capacitance of the rectifier transformer, by the capacitance of the rectifier, by the line capacitance and/or by a booster condenser.

The capacitances, in conjunction with the present inductance, provide high-frequency built-up transient oscillations, which can be separated from low-frequency oscillations by the high-pass filter and can be fed to a device for indicating flashover and to control means, respectively.

Suitably an alternating current regulator or adjuster, which may be provided in the primary alternating current circuit of the rectifier, is connected to the high-pass filter by way of a control device, thus providing control of the voltage of the alternating current in the primary circuitry.

According to a further modification of the apparatus a high-frequency transformer may be provided as the high-pass filter.

Advantageously the series rheostat, to which the high-pass filter is connected, may be formed by the primary winding of the high-frequency transformer.

With these and other objects in view, which will become apparent in the following detailed description, the present invention, which is disclosed by example only, will be clearly understood in connection with the accompanying drawings, in which:

FIGS. 3 and 4 are circuit diagrams disclosing further embodiments of the apparatus according to the present invention and employing a high-frequency transformer.

Figure 1:
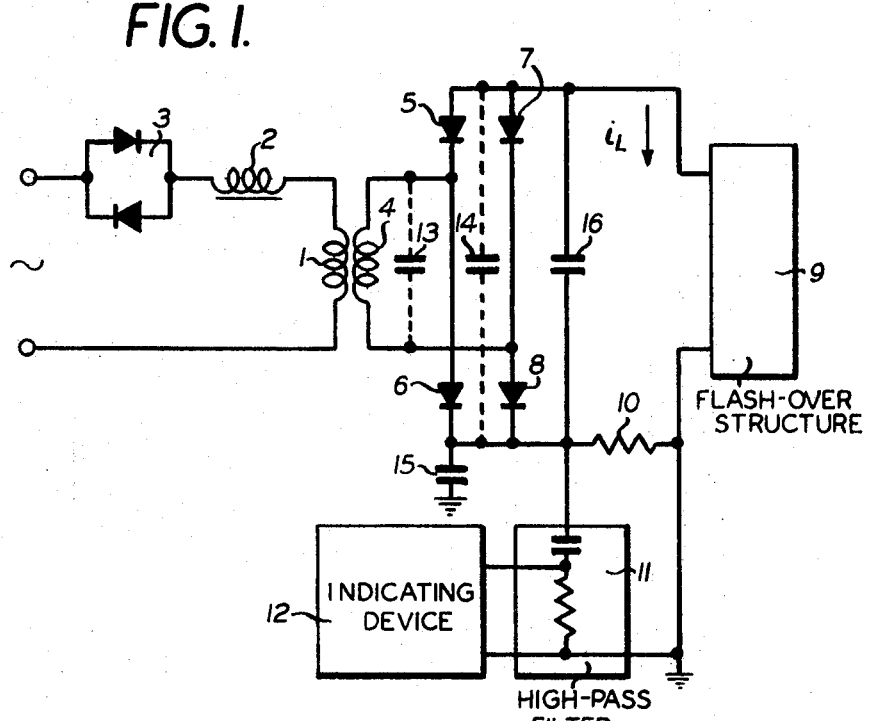
FIG. 1 is a basic circuit diagram of the apparatus designed according to the present invention.

Referring now to the drawings, and in particular to FIG. 1, the primary winding 1 of a high-frequency transformer is connected to alternating current mains by means of a protective reactance coil 2 and a thyristor alternating current regulator 3. The secondary winding 4 of the transformer is connected by a bridge rectifier 5, 6, 7, 8 to a structure 9, the input end of which is to be checked for internal flashovers.

To achieve an indication of flashover a series rheostat 10 is provided in the direct current circuit, to which a high-pass filter 11 is connected which leads to an indicating device 12.

In the embodiment shown in FIG. 1, the self-capacitances 13, 14 and 15 of the circuit and their individual component parts as well as those of an additional booster condenser 16 are of decisive importance in the function of the apparatus according to the present invention. The capacitance at the output end of the rectifier apparatus, which consists of the winding capacitance 13 of the rectifier transformer 1 and 4, the capacitance 14 of the rectifier 5, 6, 7, 8 and its load condensers (not shown), the line capacitance 15, and the booster condenser 16, discharge in the case of flashover in the device 9 and high-frequency built-up transient oscillations occur at the series rheostat 10 and these high-frequency oscillations are separated by means of the succeeding high-pass filter 11 from the low-frequency direct current and from the low-frequency alternating voltages, respectively, which also occur at the rheostat 10, and which are caused by current fluctuations in case of flashovers.

With each flashover a signal appears at the output end of the high-pass filter 11, the signal serving in the indicating device as an indication of flashover.

The device shown in FIG. 1 may be used, for example, in filters or other apparatus endangered by explosions. If required, the indicating device 12 causes the apparatus to be automatically switched off, after one or several flashovers to prevent damage.

Of course, the apparatus may also be used in other rectifier circuits, for example, for single- or polyphase rectifiers.

Figure 2:
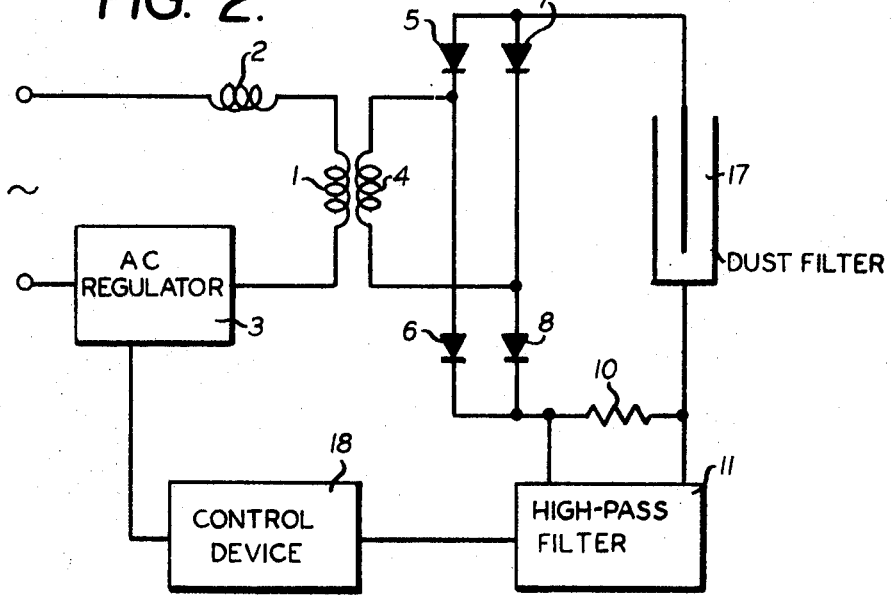
FIG. 2 is a basic circuit diagram of the same apparatus, as shown in FIG. 1, provided with an electrical precipitator filter arrangement.

Referring now again to the drawings, and in particular to FIG. 2, a device according to the present invention with an electrostatic dust filter 17 is disclosed, which replaces the structure 9 of FIG. 1. A control device 18 is connected to the high-pass filter 11 which is also in connection with the alternating current regulator or adjuster 3.

In the case of a flashover in the dust filter 17, the signal appearing at the output end of the high-pass filter 11 is fed to the control device 18, which controls the alternating current regulator 3 in such a manner, to adjust the current flow in the primary circuit and prevent reoccurring flashovers.

Of course, the invention is not restricted to the specific embodiments illustrated. Thus, for example, instead of the protective reactance coil 2, the transformer 1, 4 itself may be designed as a leakage, reactance transformer. The detection of the high-frequency built-up transient oscillations may also take place in the primary circuitry of the high-tension transformer. The thyristor alternating current adjuster 3 may also be replaced by other control elements, for example, transducers, variable-ratio transformers and the like. The device is also suitable for the detection of short-circuits and rapid current changes, in addition to flashovers.

Referring now again to the drawings, and in particular to FIG. 3, a further embodiment is disclosed, in which the primary winding of a high-tension transformer 1, 4 is connected to alternating current mains by way of a protective reactance coil 2 and a thyristor alternating current regulator 3. The secondary winding 4 of the transformer leads by way of a bridge rectifier 5, 6, 7, 8 to a structure 9, the input end of which is to be checked for internal flashovers.

For this purpose a series rheostat 10 is connected in the direct current circuit. A high-pass filter 11 which is formed as a high-frequency transformer is connected to the series rheostat 10. The primary winding 19 of the high-frequency transformer is connected to the series rheostat 10 and the secondary winding 20 is connected to a device 12 for indicating the presence of flashover.

In this case also the self-capacitances of the circuitry, which are present in the actual apparatus (not shown) and their individual component parts and those of a booster condenser 16 are of decisive importance for the function of the device according to the present invention. The capacitance at the output end of the rectifier device discharges in case of sparkover in the device 9 and a high-frequency built-up transient oscillation forms at the series rheostat 10. The high-frequency oscillation is separated by means of the succeeding high-pass filter 11 from the direct current ripple oscillation and from the low-frequency alternating voltages, respectively, which also occur at the rheostat 10 and which are caused by current fluctuations due to flashovers.

With each flashover, a signal appears at the output end of the high-pass filter 11 and on the secondary winding 20 of the high-frequency transformer. This signal serves as an indication of the flashover.

In the embodiment shown in FIG. 4, the series rheostat 10 of the embodiment shown in FIG. 3 is formed directly by the impedance of the primary winding 19 of the high-frequency transformer.

While I have disclosed several embodiments of the present invention, it is to be understood that these embodiments are given by example only and not in a limiting sense.

I claim:

1. An apparatus for the detection and indication of flashovers at the output side of a rectifier, in particular for electrostatic high-voltage filters, comprising
   a rectifier transformer,
   primary alternating current circuitry,
   secondary direct current circuitry including direct current output terminals,
   a series rheostat connected in said direct current circuitry, whereby flashovers result in a drop in potential at said series rheostat,
   said drop in potential being proportional to fluctuations of said direct current as a result of said flashover, including a capacitance provided in said direct current circuitry ahead of said series rheostat and in parallel with said output terminals,
   a high-pass filter connected with said series rheostat, and
   means for indicating a flashover connected with said high-pass filter.
2. The apparatus, as set forth in claim 1, wherein
   said capacitance is formed at least partially by at least one of the winding capacitance of said rectifier transformer, the capacitance of said rectifier, the capacitance disposed in said direct current circuitry and by a booster condenser.
3. The apparatus, as set forth in claim 1, which includes
   an alternating current regulator connected with said high-pass filter by means of a control device, and
   said alternating current regulator is arranged in said direct current circuitry of said rectifier.
4. The apparatus, as set forth in claim 3, wherein
   said high-pass filter comprises a high-frequency transformer.
5. The apparatus, as set forth in claim 4, wherein
   said series rheostat comprises the primary winding of said high-frequency transformer, and
   said high-pass filter is connected with said series rheostat.

* * * * *